(12) United States Patent
Blum et al.

(10) Patent No.: US 7,790,258 B2
(45) Date of Patent: Sep. 7, 2010

(54) SEALING TAPE FOR ADHESIVE BONDING OF VAPOUR BARRIER FILMS AND VAPOUR RETARDER FILMS, AND PROCESS FOR ITS MANUFACTURE

(75) Inventors: Walter Blum, Neuwied (DE); Dirk Wester, Wissen (DE); Volker Wiegmann, Taunusstein (DE)

(73) Assignee: Lohmann GmbH & Co. KG, Neuwied (DE)

( * ) Notice: Subject to any disclaimer, the term of this patent is extended or adjusted under 35 U.S.C. 154(b) by 279 days.

(21) Appl. No.: 10/584,226

(22) PCT Filed: Dec. 16, 2004

(86) PCT No.: PCT/EP2004/014329

§ 371 (c)(1),
(2), (4) Date: Jun. 23, 2006

(87) PCT Pub. No.: WO2005/063906

PCT Pub. Date: Jul. 14, 2005

(65) Prior Publication Data

US 2007/0148443 A1    Jun. 28, 2007

(30) Foreign Application Priority Data

Dec. 23, 2003  (DE) ................................ 103 61 475

(51) Int. Cl.
  *B32B 9/00*    (2006.01)
  *B32B 7/12*    (2006.01)
  *B32B 15/04*   (2006.01)
  *G11B 11/105*  (2006.01)

(52) U.S. Cl. .................. 428/40.1; 428/41.5; 428/332; 428/343; 428/345; 428/354; 428/355 BL; 428/906

(58) Field of Classification Search ............. 428/40.1, 428/41.5, 332, 343, 345, 354, 355 BL, 906
See application file for complete search history.

(56) References Cited

U.S. PATENT DOCUMENTS

| 3,297,846 A | * | 1/1967 | Peltier ................. 337/416 |
| 2004/0219356 A1 | * | 11/2004 | Valdez ................. 428/345 |

FOREIGN PATENT DOCUMENTS

| DE | 100 63 018 | 7/2002 |
| EP | 0604709 | 7/1994 |
| EP | 1262532 | 12/2002 |
| GB | 1357586 | 6/1974 |
| WO | WO 8900106 A1 * | 1/1989 |
| WO | WO 2004/108851 | 12/2004 |

OTHER PUBLICATIONS

Machine translation of DE 10063018, Apr. 30, 2008.*

* cited by examiner

*Primary Examiner*—Patricia L Nordmeyer
(74) *Attorney, Agent, or Firm*—D. Peter Hochberg; Sean F. Mellino; Daniel J. Smola

(57) ABSTRACT

Self-adhesive, flexible sealing tapes, comprising at least one flexible, self-adhesive core or at least one flexible, self-adhesive carrier layer provided with an envelope or two-sided coating consisting of a second adhesive system.

14 Claims, No Drawings

SEALING TAPE FOR ADHESIVE BONDING OF VAPOUR BARRIER FILMS AND VAPOUR RETARDER FILMS, AND PROCESS FOR ITS MANUFACTURE

CROSS-REFERENCE TO RELATED APPLICATIONS

This application is a National Stage application of International Application No. PCT/EP2004/014329, filed on Dec. 16, 2004, which claims priority of German application number 103 61 475.3, filed on Dec. 23, 2003.

BACKGROUND OF THE INVENTION

1. Field of the Invention

The present invention relates to a self-adhesive, flexible sealing tape on the basis of a flexible, self-adhesive core enveloped or coated with a second adhesive system, especially for adhesive bonding of vapour barrier films and vapour retarder films, as well as to processes for its manufacture.

2. Description of the Prior Art

A normal construction material moisture is unavoidable, but permanent moisture penetration of structural members in or at constructions should by all means be avoided as it frequently leads to damage.

Moisture can penetrate the constructions or structural members from the outside, mostly where a structural member is broken, blocked, torn or incomplete. Thus, a facade, for example, may become penetrated with moisture within a short time span if an eaves gutter is clogged or leaky, if roofing tiles are broken or have shifted, if connections of chimneys or skylights are defective, if there are cracks in the external plaster, or if sealings are flawed or even missing altogether.

Frequently, however, moist spots in structural members also occur because of humidity condensating at cold spots. The condensed water vapour is called "condensation water". Under certain climatic conditions, humidity in the air of a room can condensate as condensation water on wall, ceiling and floor areas either on the surfaces of or within structural members. This leads to structural elements, especially insulation material, penetrated with water, to reduced heat insulation, formation of mould, and, ultimately, to more severe structural damage.

To avoid condensation water, it is sometimes sufficient to change ones heating and ventilation habits in the rooms concerned so that no additional damage occurs. In the event of damage, sometimes extensive rehabilitation measures are necessary, however, to prevent occurrence of condensation water in the future.

To protect the bricking and the insulating material, either in new buildings or when rehabilitation measures are carried through, a vapour barrier or a vapour retarder is installed which prevents condensation water from accumulating, for example, behind an interior insulation. The humidity of the room air can then no longer reach the insulating material. In the case of roof insulations, a vapour barrier or vapour retarder at the same time increases wind proofness.

Vapour barriers and vapour retarders usually consist of films such as PVC films, PE films (polyethylene) or aluminium foils. But roofing cardboard is utilised as well. However, plasters, cardboards, wood, as well as gypsum plaster boards or derived timer boards are also suitable for constructing durable and continuous, air-tight layers.

When using vapour barrier films and vapour retarder films, these must be bonded to substrates such as concrete, bricking, plaster, rough-sawn timber and the like in such a manner that a durable seal is obtained, to be able to lastingly fulfill their sealing function. In this regard, joints in the brickwork are a particular problem.

The bond of the vapour barrier film or vapour retarder film should be permanently elastic to be able to compensate the movements of the building. A further demand is ageing resistance of the bonds, and the market also wants the adhesives to be free of solvents, environmentally harmless and immediately adhesive.

To date, vapour barrier films and vapour retarder films have been bonded using a dispersion-based cartridge adhesive. In particular, attachment of a vapour barrier film to a wall could heretofore be realised exclusively with cartridge adhesives. These cartridge adhesives are free of solvent, but, depending on ambient conditions, they develop a stable adhesion only after more than 20 minutes, sometimes taking more than 24 hours. In addition, these cartridge adhesives are subject to the risk of degrading upon subsequent access of moisture.

SUMMARY OF THE INVENTION

It was therefore the object of the present invention to provide an adhesive system that is free of solvents, environmentally compatible, instantly adhesive, flexible, permanently elastic and non-ageing.

This object is achieved, in accordance with the invention, with a vapour barrier sealing tape wherein a flexible, self-adhesive core or a flexible, self-adhesive carrier layer is provided with an envelope or a two-sided coating consisting of a second adhesive system. The structure of the vapour barrier sealing tape of the invention enables, on the one hand, a permanent adhesion of vapour barrier films or vapour retarder films and, on the other hand, on account of its flexible core, it has the property of compensating and sealing uneven areas of a surface, e.g. mortar joints or rough surfaces. In addition, the adhesive core of the vapour barrier sealing tape ensures that the system continues to be adhesive and impervious even in case of damage to the envelope or coating.

DETAILED DESCRIPTION OF THE INVENTION

The core, or the carrier layer, is a soft, permanently elastic hot melt adhesive with a low glass transition temperature (Tg). The core material has sufficient flexibility even at temperatures below +5° C. Various flexible and adhesive materials are suitable for use as the core material. Especially suitable are thermoplastic rubbers on the basis of styrene-isoprene-styrene block copolymers or styrene-butadiene-styrene block copolymers, as well as copolymers of vinyl acetate, polyisobutylene and thermally or UV-radiation cross-linked acrylates which, due to their formulation, have a glass transition temperature (Tg) of less than 0° C., for example down to the range of around −12° C.

The thickness of the core/the carrier layer is preferably between 0.1 and 8 mm, especially preferably between 1 mm and 5 mm. The width of the core/the carrier layer is preferably between 1 mm and 10 mm.

Doubling or folding of the core material/carrier layer material, to obtain greater thicknesses, is possible. The number of the cores/carrier layers per vapour barrier sealing tape can be varied, too.

The core/the carrier layer does not have to be of a particular shape. It may be round, oval, rectangular or square in cross-section, but it may also be of any other shape.

On account of its formulation, the adhesive of the core/the carrier layer is permanently conformable even at low temperatures, e.g. in the range of around −5° C.

The envelope or coating consists of an expanded pressure-sensitive adhesive tape preferably manufactured on the basis of a pure dispersion acrylate.

The pure dispersion acrylate is preferably on the basis of plasticizing monomers such as 2-ethylhexyl acrylate, 1-butyl acrylate or n-butyl acrylate. If the envelope/coating does not consist of an adhesive based on a pure dispersion acrylate, the preferred adhesives are those based on vinyl isobutyl ether or isobutenes.

Due to the expansion of the pressure-sensitive adhesive, it is possible to realise a higher coating weight, thus enabling optimal wetting of the respective surfaces, leading to optimum sealing of the vapour barrier film/vapour retarder film. This is particularly advantageous in the case of sealings that extend over joints in the masonry. The envelope/coating, in this case has a foam-like structure which ensures that the vapour barrier sealing tape of the invention is better capable of adapting to the surface structure of the substrate. In addition, the envelope/coating compensates the shape-recovery effect typical of hot-melt adhesives.

The thickness of the envelope/coating is preferably between 0.2 mm and 1.5 mm, especially preferably between 0.5 mm and 1 mm.

In one particular embodiment, the vapour barrier sealing tape according to the invention is equipped with reinforcing elements which stabilise the vapour barrier sealing tape, especially in the longitudinal direction. Suitable materials that may be used as reinforcing elements are threads, nonwovens or interlaid scrims, wovens, or knitted or crocheted fabrics.

To produce the vapour barrier sealing tape, initially, the core, or the carrier layer, and the expanded pressure-sensitive adhesive tape are manufactured as web-shaped materials in independent production processes.

To produce the expanded pressure-sensitive adhesive tape, an aqueous dispersion of the pressure-sensitive adhesive is prepared which contains a filler consisting of small thermoplastic hollow spheres of plastic filled with hydrocarbon gas. The small hollow spheres expand upon exposure to a temperature in the range from 70° C. to 140° C. This dispersion is processed to an adhesive tape, which will then be expanded.

To produce the sealing tape as such, two pre-fabricated, expanded pressure-sensitive adhesive tapes, one for each side, are then advanced towards a web consisting of the elastic core material/carrier layer material, and are combined therewith by pressure. The core does not necessarily have to be enveloped but may also be inserted as an intermediate layer between two webs of the expanded pressure-sensitive adhesive tape.

The sealing tape according to the present invention is particularly suitable for adhesively bonding vapour barrier films or vapour retarder films to substrates having rough surfaces such as concrete, masonry, plaster, rough-sawn timber and the like, especially for adhesively bonding the vapour barrier films or vapour retarder films to walls.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A self-adhesive, flexible sealing tape comprising at least one flexible, self-adhesive core/carrier layer provided with an envelope/two-sided coating comprising a second adhesive system, wherein the envelope/two-sided coating comprises an expanded pressure-sensitive adhesive tape, said envelope/two-sided coating completely surrounding/enclosing said at least one core/carrier layer, and that the material for the at least one core/carrier layer is selected from the group comprising thermoplastic rubbers on the basis of styrene-isoprene-styrene block copolymers, styrene-butadiene-styrene block copolymers, copolymers of vinyl acetate, polyisobutylenes and acrylates which have been cross-linked by a process selected from the group consisting of thermally and UV irradiation.

2. The sealing tape according to claim 1, wherein the material for the core/the carrier layer has a glass transition temperature (Tg) of below 0° C.

3. The sealing tape according to claim 1, wherein the envelope/tow-sided coating is based on a pure dispersion acrylate.

4. The sealing tape according to claim 3, wherein the pure dispersion acrylate is based on plasticizing monomers selected from the group consisting of 2-ethylhexyl acrylate, 1-butyl acrylate and n-butyl acrylate.

5. The sealing tape according to claim 1, wherein the envelope/tow-sided coating comprises an adhesive based on a material selected from the group consisting of vinyl isobutyl ether and isobutene.

6. The sealing tape according to claim 1, wherein the thickness of the core/the carrier layer is between 0.1 mm and 8 mm.

7. The sealing tape according to claim 6, wherein the thickness of the core/the carrier layer is between 1 mm and 5 mm.

8. The sealing tape according to claim 1, wherein the width of the core/the carrier layer is between 1 mm and 10 mm.

9. The sealing tape according to claim 1, wherein the thickness of the envelope/two-sided coating is between 0.2 and 1.5 mm.

10. The sealing tape according to claim 9, wherein the thickness of the envelope/two-sided coating is between 0.5 mm and 1 mm.

11. The sealing tape according to claim 1, wherein the envelope/two-sided coating has a foam-like structure.

12. The sealing tape according to claim 1, wherein the sealing tape is equipped with reinforcing elements which stabilise the sealing tape in the longitudinal direction.

13. The sealing tape according to claim 1, wherein the reinforcing element is selected from the group consisting of threads, nonwovens or interlaid scrims, wovens, knitted fabrics and crocheted fabrics.

14. Use of a sealing tape according claim 1 for adhesively bonding vapour barrier films or vapour retarder films, by adhesively bonding said films to walls.

* * * * *